US 6,633,563 B1

(12) United States Patent
Lin et al.

(10) Patent No.: US 6,633,563 B1
(45) Date of Patent: Oct. 14, 2003

(54) ASSIGNING CELL DATA TO ONE OF SEVERAL PROCESSORS PROVIDED IN A DATA SWITCH

(75) Inventors: Arthur Lin, San Ramon, CA (US); Kent Huntley Headrick, Newark, CA (US); Suhas Anand Shetty, San Jose, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/260,785

(22) Filed: Mar. 2, 1999

(51) Int. Cl.[7] ............................................... H04L 12/00
(52) U.S. Cl. ..................................................... 370/389
(58) Field of Search ................................ 370/389–394, 370/362–368; 709/224, 230–237, 244, 245; 379/395.1–395.21, 395.31, 395.32, 397, 399, 412, 428, 401, 395.7–395.72, 386

(56) References Cited

U.S. PATENT DOCUMENTS

| 5,341,477 | A |   | 8/1994  | Pitkin et al. ................. 395/200   |
| 5,408,469 | A |   | 4/1995  | Opher et al. ................ 370/60.1    |
| 5,550,816 | A |   | 8/1996  | Hardwick et al. ............ 370/60       |
| 5,566,170 | A | * | 10/1996 | Bakke et al. ................ 370/392     |
| 5,606,668 | A |   | 2/1997  | Shewd                                     |
| 5,675,759 | A | * | 10/1997 | Shebanow et al. .......... 712/217        |
| 5,684,954 | A | * | 11/1997 | Kaiserswerth et al. ...... 709/326        |
| 5,732,071 | A |   | 3/1998  | Saito et al. ................. 370/255    |
| 5,828,844 | A |   | 10/1998 | Civanlar et al. ........ 395/200.58       |
| 5,835,726 | A |   | 11/1998 | Shewd et al.                              |
| 5,838,908 | A | * | 11/1998 | Matzke et al. ............... 709/230     |
| 5,870,561 | A |   | 2/1999  | Jarvis et al.                             |
| 5,898,689 | A |   | 4/1999  | Kumar et al. ................ 370/232     |
| 5,920,705 | A |   | 7/1999  | Lyon et al. ............... 395/200.7     |
| 5,920,886 | A |   | 7/1999  | Feldmeier ................... 711/108     |
| 5,959,968 | A |   | 9/1999  | Chin et al. .................. 370/216    |
| 6,021,263 | A |   | 2/2000  | Kujoory et al.                            |
| 6,023,466 | A |   | 2/2000  | Luijten et al. .............. 370/395     |
| 6,034,964 | A |   | 3/2000  | Fukushima et al.                          |
| 6,046,980 | A |   | 4/2000  | Packer                                    |
| 6,047,322 | A |   | 4/2000  | Vaid et al.                               |
| 6,104,700 | A |   | 8/2000  | Haddock et al.                            |
| 6,252,872 | B1| * | 6/2001  | Tzeng ......................... 370/360   |
| 6,304,903 | B1| * | 10/2001 | Ward .......................... 709/224   |

OTHER PUBLICATIONS

Huan Liu, "Routing Table Compaction In Ternary CAM", IEEE Jan.–Feb. 2002.*
G. Bollano, S. Claretto, E. Filippi, A. Torielli, M. Turolla, "Merging Hardware and Software: Intellectual Property Cores for Internet Applications", Custom Integrated Circuits Conference, 2000. CICC. Proceedings of the IEEE 2000.*

(List continued on next page.)

Primary Examiner—Kwang Bin Yao
Assistant Examiner—Thai D Hoang
(74) Attorney, Agent, or Firm—Blakely, Sokoloff Taylor & Zafman LLP (57) ABSTRACT

A content addressable memory (CAM) having a search field, a mask and an output for each CAM location is used to efficiently determine a processor for processing IP packets, with each IP packet being received as a sequence of cells. IP packets may be assigned to a processor (group) based on an examination of the header data, potentially including IP header and other higher layer protocols headers. The search field of a CAM location is pre-stored with header data, and the bit positions to be searched in the location are specified by using a mask. The output of the location identifies the processor group for executing packets with headers matching the search field, with only the bits specified by the mask being compared. When a first cell of an IP packet is received, the header data is provided as an input to the CAM, and the output identifies the processor (group) for executing the IP packet.

28 Claims, 7 Drawing Sheets

OTHER PUBLICATIONS

J. van Lunteren and A.P.J. Engbersen, "Multi–field Classicfication Using Ternary CAM", IEEE Jan. 2002, vol. 38, No. 1.*

M. Kobayashi, T. Murase, and A. Kuriyama, "A Longest Prefix Match Search Engine for Multi–Gigabit IP Processing", IEEE.*

S. Correa, A. Garcia, H. Burbano, W. Ricaurte, "ASIC Design and Implementation of an Associative Memory Processor for Syntactic Recognition", IEEE Apr. 1994.*

Stamtios V. Kartapoulos, "Associative RAM–Base CAM Aplicable To Packet–Based Broadband Systems", IEEE Sep. 1998.*

Postel, J., User Datagram Protocol, RFC768, Information Sciences Institute, Aug. 28, 1980.

RFC791, Internet Protocol, DARPA Internet Program, Protocol Specification, Information Sciences Institute, University of Southern California, Sep. 1981.

Heinanen, J., Multiprotocol Encapsulation Over ATM Adaptation Layer 5, RFC1483, Network Working Group, Jul. 1993, Telecom, Finland.

Wakeman, I., et al. Nov. 7, 1994, "Implementing Real Time Packet Forwarding Policies Using Streams," Computer Science Dept., University College London.

Blake, S. 12/97, "Some Issues and Applications of Packet Marking for Differentiated Services," IBM Corporation, http://diffserv.lcs.mit.edu/Drafts/draft–blake–diffserv–marking–00.txt.

"FloodGate–1 (TM) Data Sheet, Enterprise Traffic Management," 1998, Check Point Software Technologies, Ltd., http://www.quorus.ru/technical/checkpoint/fl_gate1/fgdata.htm.

Sikora, J. and Teitelbaum, B., 1998, Differentiated Services for Internet2 (draft), http://www.internet2edu/pos/may98Workshop/html/diffserv.htm.

* cited by examiner

ASSIGNING CELL DATA TO ONE OF SEVERAL PROCESSORS PROVIDED IN A DATA SWITCH

RELATED APPLICATION

The present application is related to the following United States Patent Application entitled, "A System and Method for Providing Desired Service Policies to Subscribers Accessing the Internet", Ser. No. 09/205,041, Filed Dec. 3, 1998.

BACKGROUND OF THE INVENTION

1. Field of the Invention

The present invention relates generally to digital communication networks, and more specifically to a system and method for assigning cell or packet data to one of several processors provided in a data switch.

2. Related Art

Data switches are often used in a telecommunication network to provide connectivity between different end systems. Computer systems accessing each other are examples of end systems. A telecommunication network may include different types of equipment such as access multiplexers, modems, and data switches as is well known in the relevant arts.

A data switch commonly refers to a device which receives data on one port and forwards the data on another port, depending on the desired destination (or target) end system. Data switches often include processors for processing the data to determine, among other aspects, whether to forward a received portion of the data and the port on which to forward the received data.

Data is often sent and received in the form of cells. Cells are commonly used in the context of Asynchronous Transfer Mode (ATM) protocols. ATM cells are maintained to be uniformly small (53 Bytes), which allows for fast and flexible processing of ATM cells from different end systems. For a detailed understanding of ATM, the reader is referred to a book entitled, "ATM: Theory and Application", (ISBN: 0070603626, Published September 1994 by McGraw-Hill Series on Computer Communications), by David E. McDysan and Darren L. Spohn, which is incorporated in its entirety herewith.

Cells may need to be assigned to one of the potentially several processors provided in a data switch. Such assignment may be required for several reasons. For example, one may wish to balance the load across the available processors. In some situations, some packets may need to be assigned to specialized processors to process the cells.

In yet some other situations, the cells related to a subscriber may need to be assigned to processors designed to provide a desired set of service policies specific to the subscriber. Example embodiments providing such desired set of services to each subscriber include, but are not limited to the following: the aggregate bandwidth which can be used by a subscriber or some of the systems used by the subscriber, firewall parameters (which applications/IP addresses are permitted out/in), security (anti-spoofing, virtual private network with encryption and tunneling) for specified conversations, priority in usage of buffer and bandwidth (e.g., higher priority to interactive applications such as telenet), traffic steering, etc.

Accordingly, it may be required to assign the cell data from a subscriber to one or more pre-specified processors. The assignment of cells to processors may need to be performed in a short duration, at least to avoid excessive buffer requirements. That is, as the cells may be received at a high rate, the assignment may need to be performed within a short duration.

Often, a determination of the subscriber associated with a cell may require examination of several bytes of data encoded in a cell. The determination may need to be performed quickly at least for reasons noted above. For example, a telecommunication network may be implemented using internet protocol (IP) and an IP packet related to a subscriber may be received as a sequence of cells. The determination of the subscriber associated with the IP packet may require examination of IP addresses, port numbers etc., which are located typically in the data in the first cell of the IP packet.

Thus, several bytes of the first cell may need to be examined for a determination of the subscriber to which an IP packet relates to. All the cells forming the IP packet may then need to be assigned to a processor capable of providing the service policies specific to the subscriber.

Therefore, what is needed is a fast and flexible mechanism which allows the assignment of ATM cells to processors contained in a data switch of a telecommunication network. The mechanism needs to permit the examination of several bytes of data encoded in the cells.

SUMMARY OF THE INVENTION

The present invention provides an efficient approach for assigning an IP packet to one of multiple processors provided in an internet service node (ISN). The IP packet may be received in the form of a sequence of cells. Each IP packet may be associated with a subscriber and the P packets corresponding to a subscriber may need to be assigned to a processor designed to provide the service policies desired by the subscriber.

The determination of the specific subscriber to which an IP packet relates to may require the examination of the header data of the IP packet. Such is the case at least when cell data destined for multiple subscribers is received on a shared ATM virtual connection as all cells may contain the same VPI/VCI data. In such a situation, the subscriber may be determined by examining the IP destination address located in the IP header.

However, in some situations data further inside the IP packet may need to be examined to determine the subscriber. For example, data related to a subscriber may be received on a specific call of a L2TP tunnel. In such a situation, a received packet may need to be examined for a UDP protocol type, a UDP port number specifying L2TP protocol, a tunnel ID and a Call ID specific to the subscriber.

The present invention enables such examinations to be performed efficiently by using a content addressable memory (CAM) having a search field, mask, and output field for each CAM location. The search field of each location may be configured to store the data identifying a subscriber, and the output field may be configured to store data identifying a processor or a group of processors capable of providing the desired service policies to the subscribers related to the CAM entry.

In addition, the mask for each CAM location may be setup for examination of the bits identifying the subscriber. As an illustration, when data for multiple subscribers is received on a shared ATM connection, a CAM location may be designed to examine only the destination IP address. On the other hand, when data for a subscriber is received on a L2TP tunnel, the mask field of the corresponding CAM location may be set up to examine several more bytes of data.

Thus, when a first ("header") cell of an IP packet is received, the header data is provided as an input to the CAM, and the output data identifies a suitable processor. As different CAM entries can have different masks, a matching entry can be found in a single CAM access. The output of the matching entry may either represents a processor (group) identifier or may lead to further accesses to determine the processor.

When the output data does not represent a processor identifier, in the embodiments described herein, the output data either contains an index into an IP table or indicates that additional CAM searches are required to determine a processor (group) identifier. The index is useful to minimize the number of CAM entries. The index may be used to select an entry from a table stored in a fast memory (e.g., SRAM), and the retrieved value may represent the processor identifier or processor group identifier. As an illustration, the CAM entry may examine only the first three bytes of an IP address by choosing an appropriate mask, and thus present a matching entry for 255 IP addresses. The additional access to the fast memory may provide the specific processor identifier.

Additional CAM searches are generally required when a CAM does not contain sufficient number of bits in the search field to identify a subscriber. For example, when subscriber data is received using a L2TP tunnel, it may be required to examine more number of bits than that available in a search field of a single CAM location. In such circumstances, some of the bits may be examined in a first search and the others in a subsequent search. Only if a match is detected for all the searches, a match is deemed to have occurred.

In an embodiment described in the present application, only two searches may be required. However, embodiments requiring additional approaches are contemplated to be within the scope and spirit of the present invention. The searches may be required depending on the formats for the protocols and the number of bits which need to be examined.

The above-noted features can be implemented in either access ports receiving cells from subscribers or trunk ports receiving cells destined for the subscribers in an embodiment of an ISN. The ISN may include multiple processor groups, with a single group typically being configured to process IP packets related to a subscriber. In addition, a switch fabric may be designed to assign cells to one of the groups based on the header of the received cells. Specifically, the VPI/VCI field may uniquely identify the processor group to process the cells received by the switch fabric.

Accordingly, a replacement logic of the present invention determines the processor group by using the CAM, and replaces a portion (e.g., VPI) of the cell header of all cells of the IP packet with the processor group identifier. The switch fabric may then assign all the cells related to an IP packet to the processor group identified by the cell header (VCI/VPI).

Therefore, the present invention provides for a quick and efficient method to assign cells forming an IP packet to a pre-specified processor or processor group by using a CAM with masks for individual locations.

The present invention provides for the determination of an identifier in a single CAM access as each location can be configured with a mask corresponding to the bits which need to be searched for the subscriber (related to the location).

The present invention minimizes the number of required CAM locations by using a single CAM location for a group of IP addresses, and using the output of the CAM access as an index to retrieve the processor or processor group identifier.

The present invention enables a switch fabric to quickly forward IP packets to corresponding processors by substituting the determined processor identifier for the VPI in the cells and by having the switch fabric use the VPI to assign the cells to the processors.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Present Invention

A data switch in accordance with the present invention uses a content addressable memory (CAM) provided with masks for individual memory locations to determine the processors to which to assign an IP packet received in the form of a sequence of cells. Each CAM location may be programmed with a mask identifying the bit positions to be searched (examined or compared), and the corresponding bit positions are set to pre-determined values. The pre-determined values and masks for a CAM location may identify a subscriber (or a group of subscribers) and the output of the CAM location may contain data identifying a processor (group) to which the IP packet may need to be sent.

Data identifying the processor may be stored in the corresponding CAM location such that the identification data is generated as a CAM output when the data in the search fields matches the cell data input to the CAM. Thus, by sending the cell data as an input to the CAM, data identifying the appropriate processor for processing the cell can be generated as output.

As CAMs generally generate output quickly, the processor for processing a cell can be determined in accordance with the present invention. In addition, as the masks are provided for each of the CAM locations, a single search cycle may be sufficient to determine a matching entry. In contrast, in an alternative embodiment employing CAMs providing for only one mask per search, multiple searches with each search having a different mask, may be necessary to determine a matching entry.

However, some CAMs may not have sufficient word length (number of bits in each CAM location) to search a part of the cell data containing the information for determining the processor(s). In such situations, multiple CAM locations may be used for the determination of the target processor, with each location containing a corresponding mask and search data. If necessary, an order may be defined in the multiple searches, with a search being performed only if a previous search resulted in a match. In addition, the output of the previous search can be used as input data for a present search when a search order is present.

Again, as each search can be performed quickly, the processor identifier can be determined in a timely manner even in the case where multiple searches are required.

The present invention can be appreciated well with an understanding of an environment requiring a sequence of CAM searches. Accordingly, an example environment requiring multiple searches for determining appropriate processor(s) for processing cell data is described first. The manner in which some problems in the environment can be solved in accordance with the present invention is described next.

2. Example Environment

Figure 1:
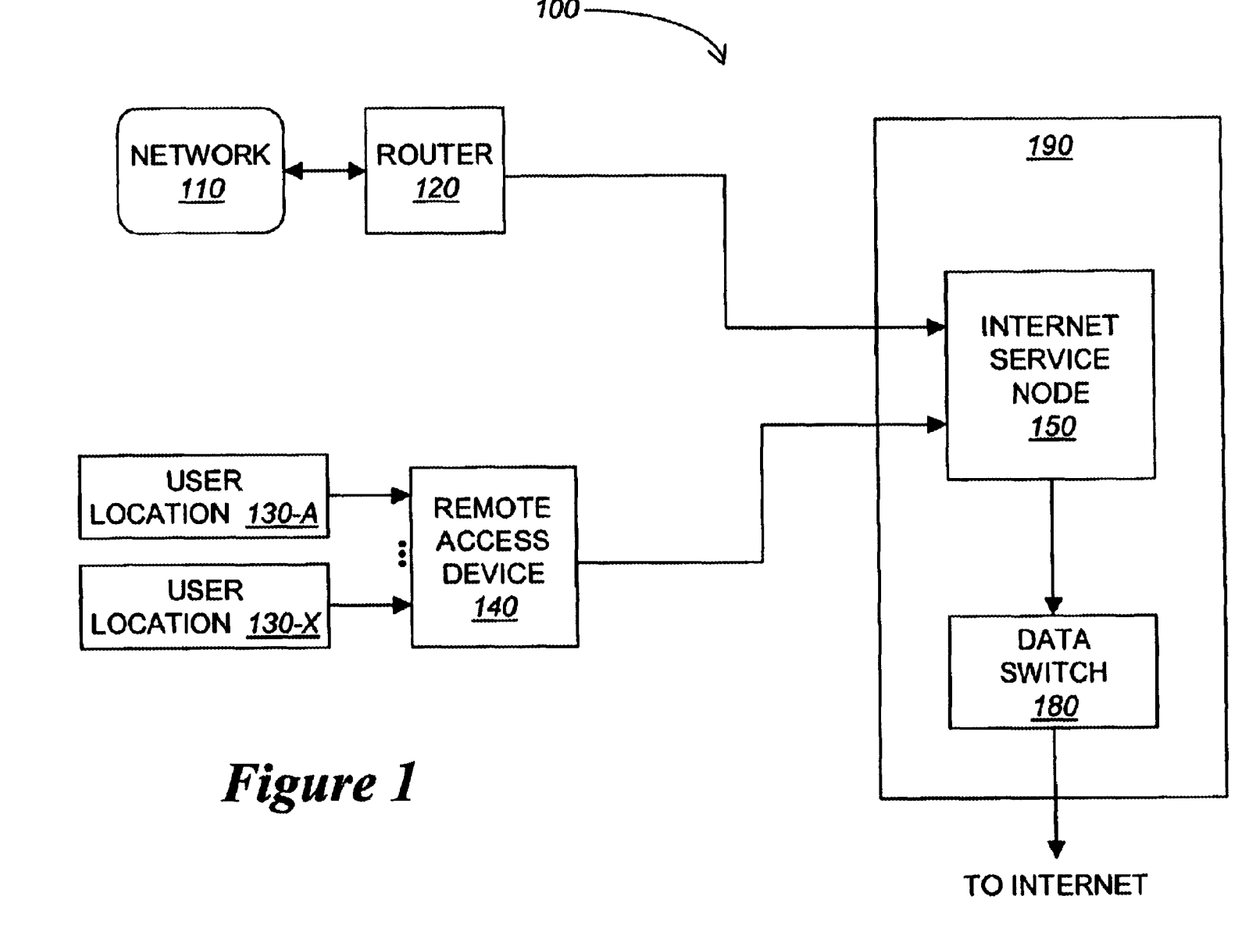
FIG. 1 is a block diagram of a telecommunication system illustrating an example environment in which the present invention can be implemented.

FIG. 1 is a diagram illustrating an example telecommunication environment 100 in which the present invention can be implemented. As briefly described below, each subscriber may be provided desired subscriber policies and such provision may require CAM lookups in accordance with the present invention. More specifically, FIG. 1 illustrates different user (subscriber) locations (110, 130-A and 130-X) interfacing with internet service node (ISN) 150 using different access technologies. ISN 150 is provided in access network 190. User network 110 may contain several systems connecting to router 120. User network 110 may be viewed as containing one subscriber or multiple subscribers.

Router 120 may transfer data to ISN 150 as IP packets using protocols such as serial line interface protocols (SLIP) or point-to-point protocol (PPP). User location 130-A and user location 130-X are shown connected to remote access device 140, which may correspond to a remote access server (supporting analog and/or digital modems) or DSLAM implemented in a known way. Remote access device 140 may transfer data as IP packets segmented into ATM cells.

ISN 150 processes the data received (on various interfaces) to provide desired service policies to different subscribers. Even though not shown, remote access device 140 may also be considered part of access network 190. Also, ISN 150 may interface directly with the Internet instead of relying on data switch 180. In general, data switch 180 may be needed if ISN 150 is not implemented including routing functionality.

The desired service policies are specified by or translated into processing rules, which indicate the manner in which data corresponding to different subscriber applications needs to be processed. To enable different cells to be correlated with different applications, ISN 150 may combine the cells into packets containing the necessary information. The processing rules are then applied to packets to provide the desired service policies. Data switch 180 may receive cells from ISN 150 and interface with other external systems in the Internet. Data switch 180 may correspond to an IP router, ATM or frame relay switch according to a pre-specified design.

As also shown in FIG. 1, ISN 150 has particular application for remote access service providers such as ISPs and LECs (incumbent or competitive). Because of the ability to provide desired service policies to various subscribers, ISN 150 of the present invention may be placed at the edge (i.e., interfacing with subscriber equipment) of remote access network 190. In such a case, ISN 150 may be referred to as an edge device, ingress/egress router or gateway.

As will be apparent from the description below, using ISN 150 at the edge enables subscriber equipment (e.g., router 120) to be implemented with less complexity, and thus to provide easier management and lower cost. Such a feature is particularly important for ISPs and LECs.

To achieve acceptable high throughput performance, it is often necessary to include multiple processors in ISN 150 as illustrated below with reference to FIG. 3. Some typical problems will be described with the embodiment(s) of FIG. 3, and the manner in which the present invention addresses the problems will be described then.

3. Internet Service Node

Figure 3:
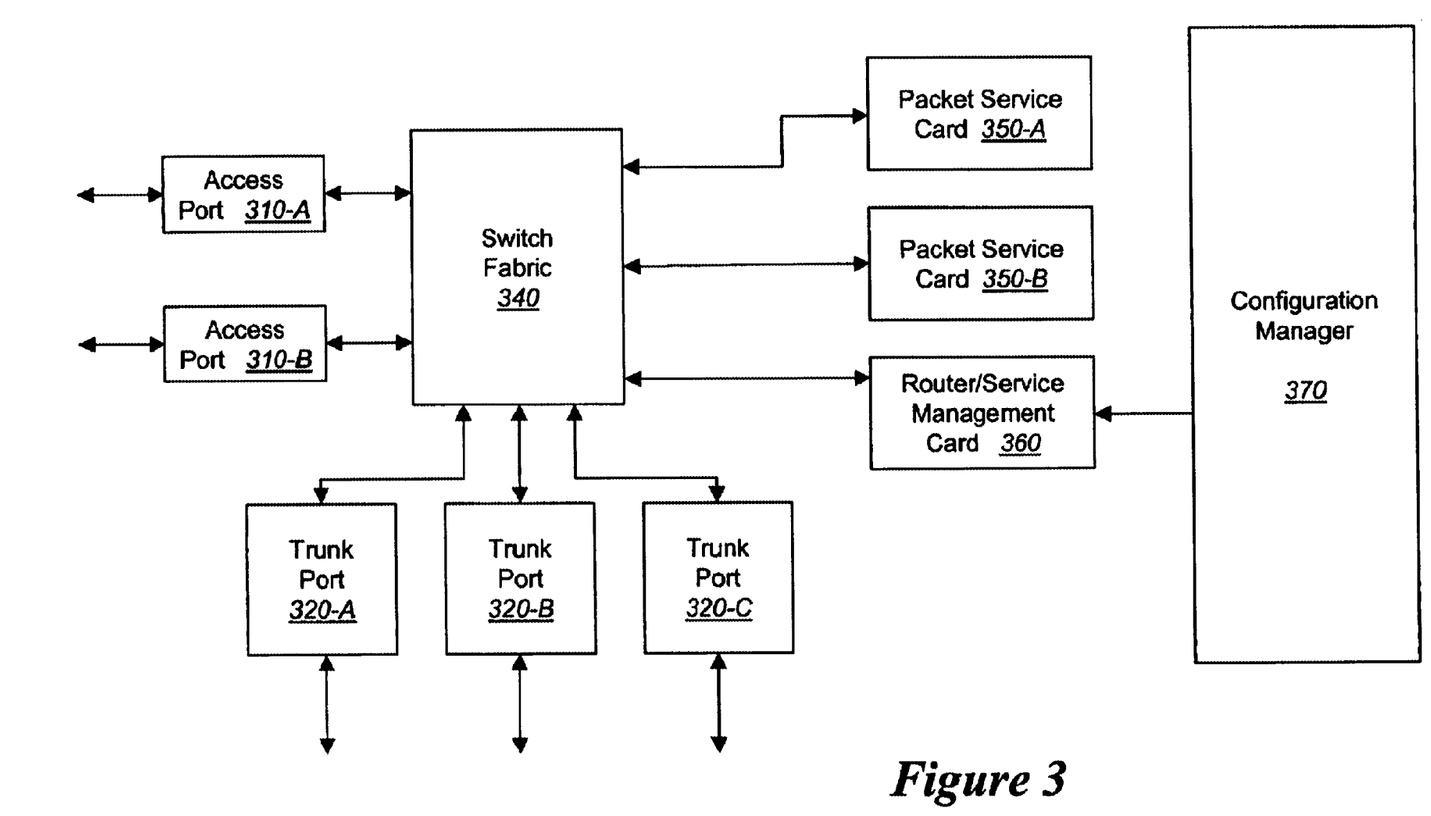
FIG. 3 is a block diagram of an embodiment of internet service node (ISN) provided in accordance with the present invention.

FIG. 3 is a block diagram illustrating the details of ISN 150 in one embodiment. ISN 150 may include access ports (310-A and 310-B), trunk ports (320-A, 320-B and 320-C), switch fabric 340, packet service cards 350-A and 350-B, route/service management card (RMC) 360 and configuration manager 370. Trunk ports 320-A, 320-B and 320-C will be collectively or individually referred to by 320 as will be clear from the context. Similar convention is used with reference to other components described in the present application.

Access ports 310 provide the necessary physical interface to receive and send cells in a pre-specified format. Protocols such as Sonet may be used for high speed interface. For purposes of illustration, access ports 310 will be assumed to send and receive data in the form of ATM cells. Each subscriber port 310 forwards the ATM cells to switch fabric 340.

Trunk ports 320 provide high speed access lines for internet access to subscribers. Trunk ports 320 may receive ATM cells from switch fabric 340, and forward the cells on the corresponding lines as specified by the channel identifier (or other destination address). Similarly, access ports 310 may receive ATM cells or IP packets from the Internet and send the cell data to switch fabric 340. In an embodiment, multiple ports are provided on a line card and each port can be configured either as a trunk port or access port. The line cards can support different access technologies such as frame relay, ATM, packet over Sonet, Fast Ethernet, Gigabit Ethernet.

Configuration manager 370 provides a convenient user interface to enable different service policies to be specified for different subscribers. The service policies determine the services provided to different subscribers. Configuration manager 370 may communicate various configuration parameters (as determined by the service policies) to RMC 360, and RMC 360 may in turn configure the different components to provide the service policies. In an embodiment, configuration manager 370 is implemented as a separate computer system, which interacts with ISN 150 according to a pre-specified protocol. In an alternative embodiment, configuration manager 370 may be integrated into ISN 150.

Route/service management card (RMC) 360 executes routing protocols such as Open Shortest Path First (OSPF), RIP, or BGP to determine the next hop (or forwarding information in general) for each IP packet. The routing protocols can be executed in known way. RMC 360 may provide forwarding information in the form of VCI/VPI information to identify the next hop of the IP packet.

In addition, RMC 360 may configure different components of ISN 150 to enable different features of the present invention. With respect to L2TP, RMC 360 may be designed to process the requests for setting up an L2TP tunnel and calls within the tunnel. RMC 360 may provide the call ID, tunnel ID and any other information necessary to the corresponding access/trunk port receiving data related to the tunnel. The access port may then use the information to assign IP packets received in the tunnel to a specific packet service card 350.

Packet service cards 350 may be configured with several processing rules, with each processing rule containing a classifier and an associated action. The classifier generally specifies the data flow(s) and any conditions under which the action can be applied to a set of data bits transferred on the data flow(s) to provide the service policies desired for each subscriber. In the internet protocol (IP) environment, the source/destination IP addresses, source/destination ports and the protocol type field together generally define an IP data flow supporting a specific remote access application.

Each packet service card 350 may be configured with the processing rules corresponding to a subscriber for one of several reasons. For example, by assigning the data processing for each subscriber to a specific packet service card 350, each packet service card 350 may need to be configured only with the processing rules corresponding to the subscribers assigned to it.

Multiple packet service cards 350 may be employed to scale well to large complex large environments. In addition, some of the packet service cards 350 may have specialized functionality for processing some types of subscriber data.

Packet service card 350 may first assemble the cell data into packets which can be identified with the flow used in classifiers, and apply the processing rules. In the process, packet service card 350 may determine whether to discard or forward the packet. Packet service card 350 may process the received cells according to the processing rules for the subscriber to provide the desired service policies to each specific subscriber.

Packet service card 350 may determine the next hop for the packet based on the routing information provided by route management card 360 or the cell header associated with the incoming cells. A new VCI/VPI number is generated according to the next hop for all the cells to be generated from the processed packet. Packet service card 350 sends the cells with the new VCI/VPI number to switch fabric 340 for forwarding on appropriate trunk port 320.

Switch fabric 340 receives cells from access ports 310 and trunk ports 320, and forwards the cells to one of the packet service cards 350. Switch fabric 340 may forward the received cells to packet service cards 350 upon receiving the data for an entire packet. Switch fabric 340 may use a high speed random access memory (not shown in the diagrams) for buffering the cells while awaiting the arrival of the last cell. The last cell for a packet may be determined according to AAL5 protocol well known in the relevant arts. Thus, all the cells forming a frame may be sent to an appropriate packet service card 350 once the data for a packet is available.

Switch fabric 340 may receive packets from packet service cards 350 after processing according to the service processing rules, and send the received packets on one of the trunk ports 320. The specific trunk port 320 may be determined by associating a specific trunk line card 320 for each channel, which may also be identified by a channel identifier provided by packet service cards 350. Switch fabric 340 may convert the packets into cells prior to transmission on trunk line card 320.

Thus, from the above description, it may be understood that the cells corresponding to each subscriber may need to be assigned to a corresponding packet service card 350 in the example environment of FIG. 1. In addition, each packet service card 350 may contain multiple processor groups for scalability. The assignment problem can be better appreciated by first understanding the internals of packet service card 350.

4. Packet Service Card

Figure 4:
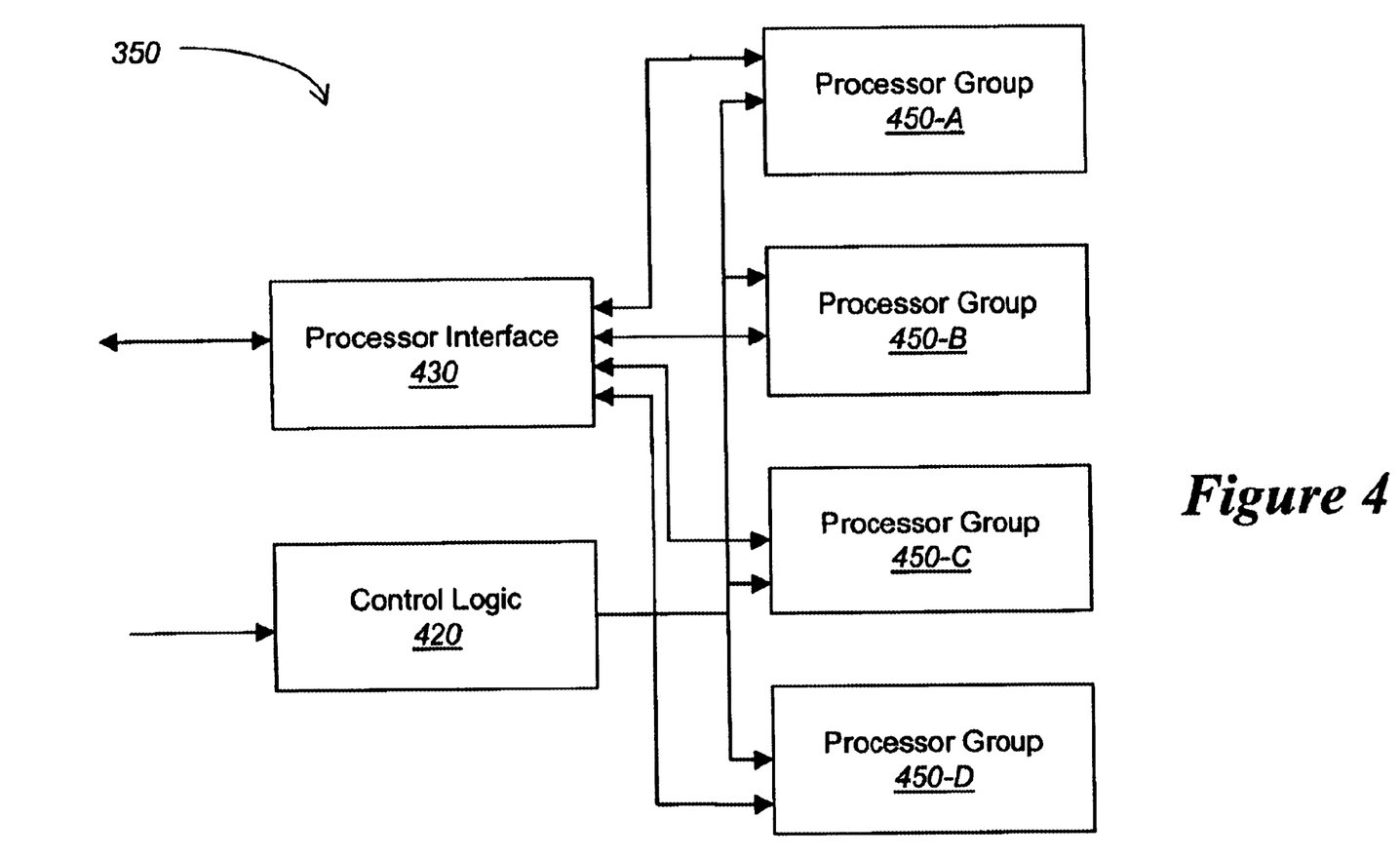
FIG. 4 is a block diagram of an embodiment of packet service card provided in an ISN in accordance with the present invention.

FIG. 4 is a block diagram illustrating the details of an embodiment of packet service card 350. Packet service card 350 may contain four processor groups (450-A through 450-D), processor interface (PIF) 430, and control logic 420. Control logic 420 coordinates and controls the operation of other components in packet service card 350. The operation of the other blocks is described below in detail.

Several subscribers may be uniquely assigned to each processor group 450. RMC 360 may generate the necessary commands to configure each processor group 450 with the processing rules associated with the assigned subscribers. RMC 360 may determine which specific processor group 450 is to process data related to each subscriber, and configures the corresponding processor group with the processing rules associated with the assigned subscribers. The configuration commands may be issued via processor interface 430.

Each processor group 450 may contain several processors and an SRAM (not shown) for storing the cells related to a packet. The SRAM may be shared by all the processors contained in the processor group 450. All processors in a processor group 450 may be capable of processing data related to all the assigned subscribers. While a processor group may be determined by the channel identifier associated with the cells, the specific processor processing the packet may be determined by control logic 420.

PIF 430 may receive cells from switch fabric 340 and forward the cells (forming an IP packet) to one of the four processor groups 450. In an embodiment, PIF 430 may contain four input ports corresponding to the four processor groups, and switch fabric 340 may send the cells on one of the four ports (and thus to a specific processor group) as determined by the VCI header information. That is, the VCI header may determine not just the packet service card, but also the specific processor group for processing the received cells.

From the above description, it may be noted that the switch fabric 340 may use the VPI/VCI to assign IP packets to specific processor groups. Some problems in such an approach are noted first below.

5. Problems With Assignment to Processors

As may be noted from the above description, switch fabric 340 may need to assign cells of an IP packets to a specific processor group 450. As switch fabric 340 may receive cells on different access ports and trunk ports, the assignment to a specific processor group 450 may need to occur quickly (in a short duration of time).

For quickness, the assignment may be based on the examination of cell headers. In the further description below, the assignment will be assumed to be based on VPI only. When cells are received on access ports 310, the VPI number of the connections on which the cells are received may be controlled to correspond with an identifier of the specific processor group 450 as will be apparent to one skilled in the relevant arts.

However, when cells are received on trunk ports 320, multiple subscribers typically share the same ATM virtual connection. Subscriber data for different subscribers received on the same ATM connection may need to be assigned to different processors. In such situations, the data in the ATM cells may need to be examined for determination of the specific processor for processing the ATM cells.

In the case of IP networks, the IP destination address contained in the payload of the first ATM cell of an IP packet may need to be examined to determine the (subscriber) processor to assign the IP packet to. As is well known in the relevant arts, a sequence of cells represents an IP packet, and the first cell typically contains the IP destination address. Accordingly, it may be necessary to examine at least the IP header information when cell data is received from trunk ports 320.

The need to examine the cell data is not limited to cases when cells are received on trunk ports 320. The cell data may need to be examined when the cells are received on access ports 310 as well. For example, when cells relate to applications such as tunneling (e.g., L2TP and L2F) and IP security (typically containing data related to multiple subscribers on the same virtual circuit), the header data for higher layers (e.g., UDP, TCP) may need to be further examined to determine the specific processor for processing the cells.

Such a requirement is illustrated with reference to L2TP for conciseness. However, it should be understood that the present invention may be applied to several other applications. Using the present invention in the context of such applications is contemplated to be within the scope and spirit of the present invention.

In L2TP, all IP packets using a tunnel share the same IP destination address, that is, one of the IP addresses assigned to ISN 150. However, L2TP is generally implemented on top of UDP protocol type, and the UDP port number identifies that the IP packet relates to a L2TP tunnel. Further, the tunnel ID and call ID fields in the UDP packet may identify the specific subscriber to which an IP packet may relate to. The processor for processing may be determined based on the identity of the subscriber. Accordingly, it may be necessary to examine the higher layer protocol (UDP) headers or further information in the packet to determine the subscriber information.

To enable switch fabric 340 to assign the cells to one of the packet service cards 350 based on examination of the cell header, it may be desirable to substitute a different cell header (or other identification data) to enable switch fabric 340 to assign cells to a packet service card 350 identified by the cell header. Such substitution may be required in both the examples of above. The examination of higher layer protocols and substitution may need to be performed in real-time to avoid extensive buffering.

The present invention enables examination of cell headers and substitution using CAMs having masks for individual memory locations. The operation of CAMs with masks for individual memory locations is generally described first. The present invention is described then with examples.

6. CAMs With Masks for Individual Memory Locations

Figures 2A, 2B:
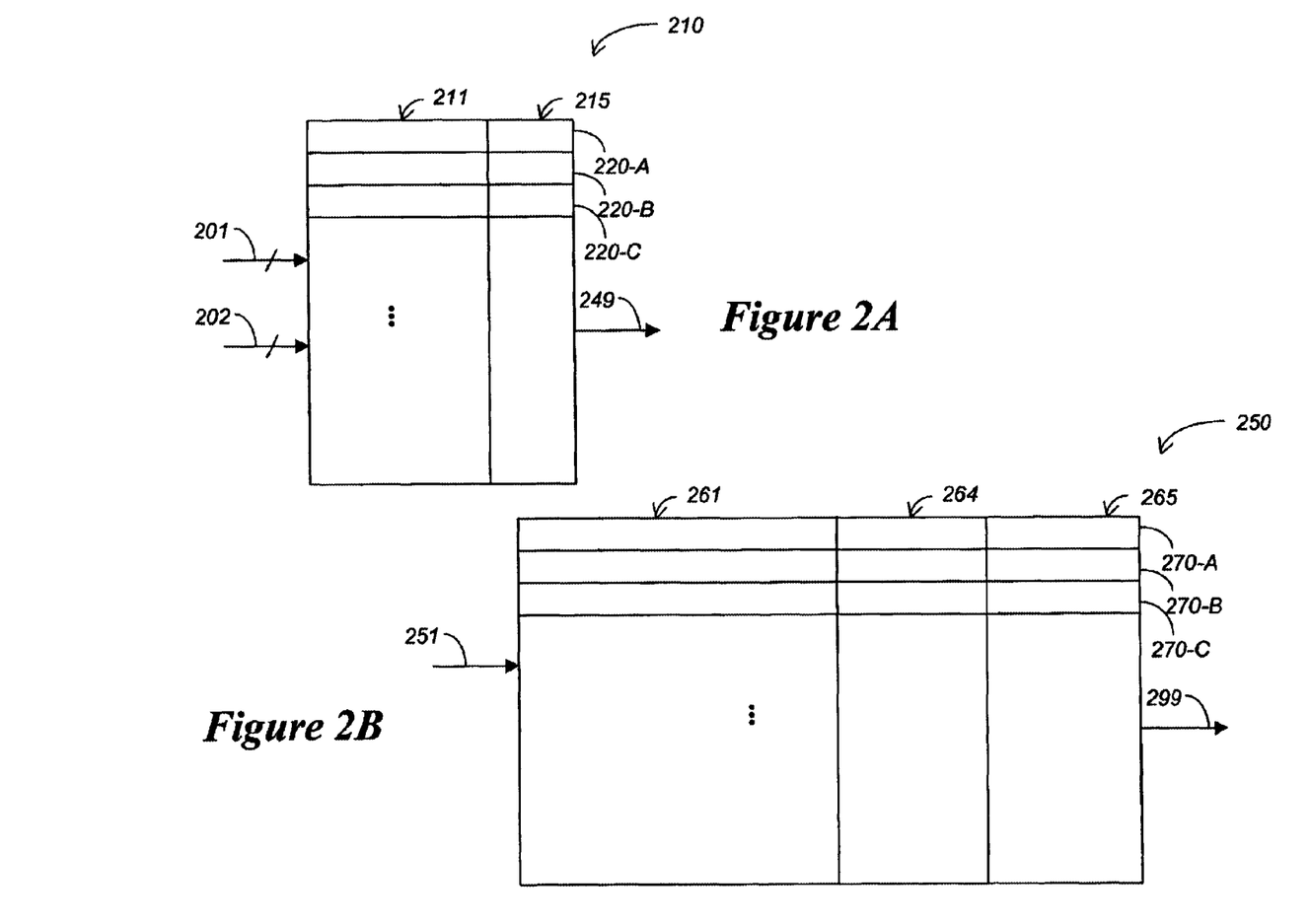
FIG. 2A is a block diagram illustrating the operation of a CAM with only one common mask for all memory locations.
FIG. 2B is a block diagram illustrating the operation of a CAM with a mask for each memory location.

To appreciate the efficiencies achieved by CAMs with masks for individual memory locations, the operation of conventional CAMs are first described with reference to FIG. 2A. FIG. 2A includes CAM 210 which generally provides for only one mask for access. CAM 210 is shown as having search field 211 and output data field 215 for each of CAM locations 220-A, 220-B, etc.

In operation, an input value and mask are respectively received on value bus 201 and mask bus 202. Each of the input value and mask has a number of bits equal to the search field length (number of bits in search field 211). The data stored in output field 215 is generated as output on output bus 249 if the input value at bit positions specified by mask bus 202 match (or equal) the corresponding bits of search field 211. That is, only the bits in bit positions specified by mask 202 may be compared.

Thus, if different bit positions need to be matched in different memory locations 220 of CAM 210, a corresponding number of multiple accesses (each with a different mask) may need to be performed.

It should be appreciated that the IP header (including UDP/TCP/ICMP information) data identifying each subscriber may be stored in each of the locations 220, and IP header data in a received first cell of an IP packet may be provided as value 201. However, as the bit positions to be examined differ for different situations (e.g., when differentiation is based on IP destination address only, the IP destination address need to be examined; and the IP destination address, protocol type, UDP port number, tunnel ID and port ID may need to be examined for L2TP), different mask values may need to be provided on mask bus 202.

That is, multiple CAM accesses may need to be performed, with each access having a corresponding mask representing the bit positions to be examined for a subscriber match. Such multiple CAM accesses may consume undesirably long duration of time, and may thus be undesirable.

An alternative embodiment may use multiple units of CAM 210, with each CAM serving subscribers with a specific mask. However, multiple CAMs may be undesirable at least due to cost considerations. A single CAM with masks for individual CAM locations may be used which avoids the need for multiple accesses as described below.

FIG. 2B is a block diagram of CAM 250 having multiple locations (270-A, 270-B and 270-C). CAM 250 may include input bus 251, search field 261, output field 265 and output bus 299, akin respectively to input bus 201, search field 211, output field 215 and output bus 249 of FIG. 2A. In addition, CAM 250 includes mask field 264, which stores a mask associated with individual locations 270. Therefore, instead of a common mask for all locations, an individual mask may be associated with each location of CAM 250.

In operation, when an input value (input bits) is provided on input bus 251, only the bit positions of each CAM location specified by the corresponding mask are compared with the input bits, and the output value in output field 265 for a matched location is provided on output bus 299. The output value may identify (either directly or indirectly) the processor to which the cell (or packet) may be assigned to for further processing.

Thus, different masks can be used for different locations. Each mask specifies the bit positions to be compared. The bit positions in turn are determined by the specific fields to be compared in the determination of a processor for processing cells as illustrated below.

7. Illustration With Reference to IP Environment

This section provides illustrations with reference to determining the subscriber (and thus the processor for processing) in two example scenarios: (1) When IP destination address uniquely identifies the subscriber, and (2) for L2TP. In the description of this section, the manner in which IP packets can be identified with a corresponding subscriber is described first. The manner in which such identification can be used for assignment of cells in an example embodiment is then described.

In general, it should be understood that the bit positions to be identified depends on the specific format used by the protocols. Information on IP and L2TP can be found in Request for Comments (RFCs) 768, 791 and 1483, which are all incorporated in their entirety into the present application herewith.

As to the example scenario 1, to determine a matching destination IP address in version 4.0 of the Internet Protocol, the following bit positions (expressed in terms of byte boundaries, with each byte containing 8 bits) may need to be examined to determine the following relationships:

Byte 1: IP version number=4; and header length=20 bytes; and

Bytes 17–20: Destination IP address of the received packet=IP address assigned to the specific subscriber.

Similarly, when subscriber data is received using L2TP, the following bit positions may need to be examined (i.e., unmasked in mask) to identify a subscriber (to whom the IP packet relates to) and thus the processor:

Byte 1: Same purpose as above

Byte 10: Protocol type=UDP

Bytes 17–20: Destination IP address of the received packet=IP address of an interface of ISN 150

The below bytes are examined assuming a IP header length of 20 bytes Bytes 23–24: Destination UDP port number=Port number of L2TP protocol Bytes 29–30: L2TP version, length and header information Bytes 31–32: If length is not present, Tunnel ID assigned to the subscriber=tunnel ID specified by the received IP packet Bytes 33–34: If length is present, Tunnel ID assigned to the subscriber=tunnel ID specified by the received IP packet Bytes 35–36: Call ID of the received packet=Call ID assigned to the specific subscriber.

Thus, in general, each search may require examination of some bit positions which identify the packet format, version number and application type (e.g., L2TP), and some other bit positions which are specific to a subscriber (e.g., call ID and/or tunnel ID for L2TP case and destination IP address in the first example above). When all the bit positions match, a received IP packet may correspond to the subscriber associated with the matched location.

Continuing with reference to FIG. 2B, one CAM location may be allocated for each search. For example, CAM location 270-A may be allocated for a search of the type of Example 1 above, and CAM location 270-B may be allocated for a search of the type of Example 2 above. Mask field 264 for CAM location 270-A may have bit positions corresponding to bytes 1, 17 and 18 unmasked (set to 0), and the remaining bits may be masked (set to 1). Search field 261 of CAM location 270-A may contain data identifying the IP protocol version number, length, and the IP address identifying a subscriber system in the corresponding bit positions.

The contents of CAM location 270-B may be similarly described. The bit positions according to the bytes noted above may be unmasked. Search field 261 may be set with appropriate values in the corresponding positions, with the tunnel ID and/or call ID uniquely identifying a subscriber.

Multiple entries may be required for determining a subscriber if more than one protocol format needs to be supported. For example, in example 2 of above, one entry may need to be implemented for examining bytes 31 and 32 if length field is not present, and another entry may need to be implemented for examining bytes 33 and 34 if length field is present. Similarly, more entries may need to be implemented if a different version of IP protocol (e.g., IP version 6) can potentially be used by a subscriber. In general, the entries in CAM 250 define a search tree, with each leaf identifying a subscriber. Multiple leafs may identify the same subscriber.

Once the header data (for IP and higher protocol data) is provided as input on input bus 251, the data stored in the output field 265 is provided as an output on output bus 299. As should be appreciated, data identifyng multiple subscribers may be stored in locations 270, and a match is detected in a single access.

However, the width of the search field (and thus of mask and inputs) may need to be at least 40 bytes (320 bits) to examine the IP header and higher layers information completely. Often, commercial embodiments of CAMs with masks for individual locations are of less width. At least to address the width problem, some optimizations described below may be employed.

8. Optimizations

In an embodiment, only bytes 1, 7, 8, 10, 13–15, 17–20, 23, 24, and 27–36 of the IP packet are examined assuming an IP header of 20 bytes and version 4 of IP. However, different bit positions may be searched depending on the specific application as will be apparent to one skilled in the relevant arts based on the description provided herein. Such searches are also contemplated to be within the scope and spirit of the present invention.

The bytes noted above contain the information for applications such as L2TP, L2F, IPSEC well known in the relevant arts. By avoiding the other bytes in the search process, the required CAM width is minimized to 24 bytes (192 bits). However, it may be a requirement to operate with CAMs of smaller width. In an embodiment described below, a CAM providing for only 112 bits (14 bytes) in search field 261 may be provided.

In such a case, a search may be split into a sequence of searches, with subsequent searches being performed only upon a match of the previous searches in the sequence. A match of all the searches in the sequences indicates that the received IP packet relates to a subscriber to which the sequence of searches relate to, and a processor specified by the CAM output is used to process the IP packet.

Operation with CAMs of inadequate width is described with reference to L2TP below. The CAMs may be implemented with in the access ports 310 and trunk ports 320. For illustration, implementation in trunk port 320 is described below.

9. Trunk Port

Figure 5:
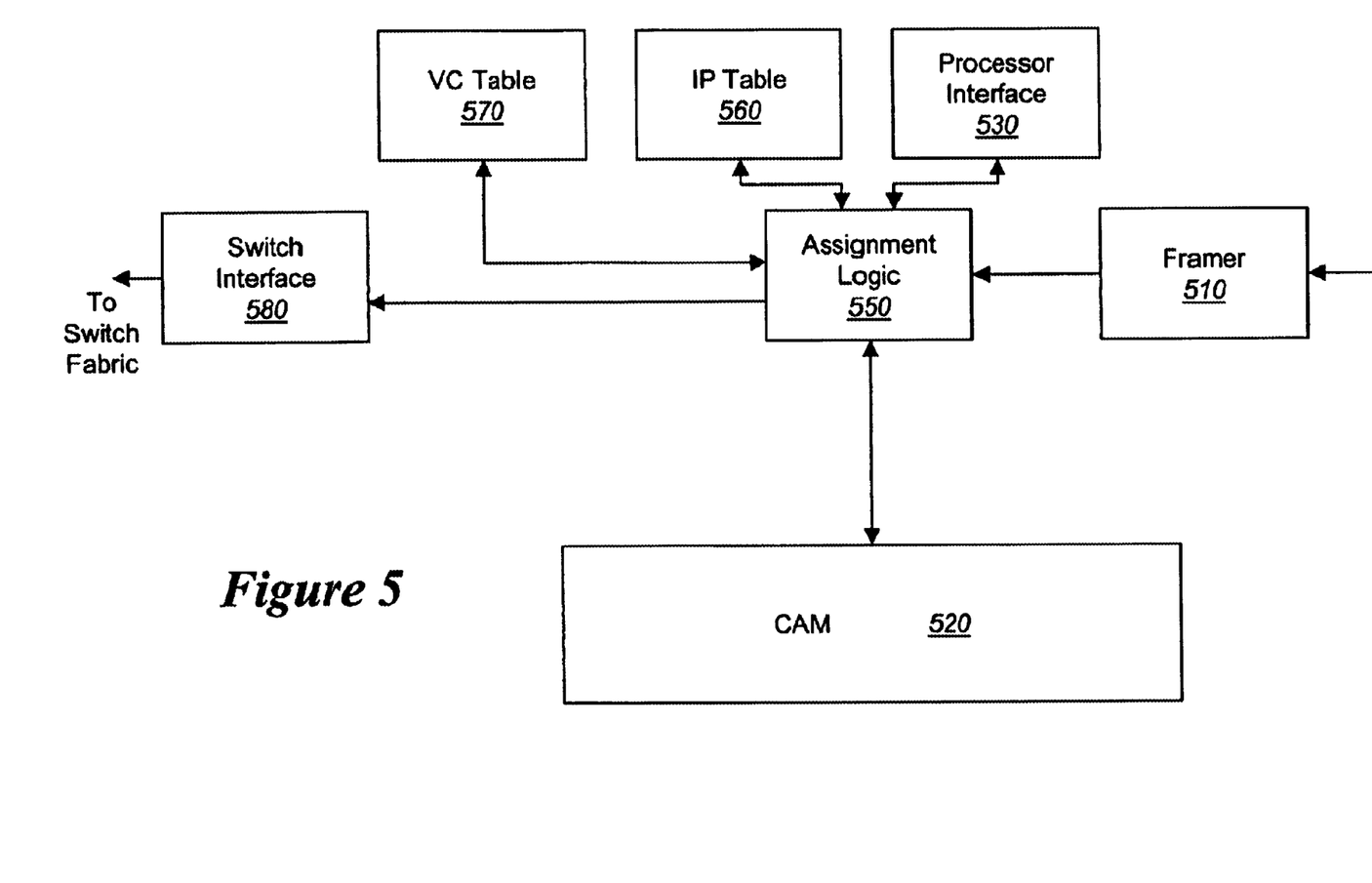
FIG. 5 is a table illustrating a circuit which determines the processor for processing an IP packet in an embodiment of the present invention.

FIG. 5 is a block diagram illustrating a circuit for implementing the present invention. Framer 510 may provide the electrical interface when receiving the subscriber data. Framer 510 may assemble bytes from the received bits, and provide the assembled bytes to assignment logic 550. The bytes constitute cell data. Switch interface 580 receives cell data from assignment logic 550 and forwards the received data to packet service card 350. Framer 510 and switch interface 580 may be implemented in a known way.

IP table 560 enables the assignment of IP packets to processors based on the source or destination IP addresses. Specifically, by using IP table 560, the present invention may minimize the number of CAM locations required for supporting multiple subscribers. The CAM lookup may be used to first generate an index, and the data in table 560 may be used for a further determination of the specific processor group to which to assign the IP packet.

Processor interface 530 may interface with RMC 360, and configure CAM 520 to enable the data related to each subscriber to a specific processor group in accordance with the present invention. Processor interface 530 may further configure IP table 560 and VC table 570 under the control of RMC 360. As related to L2TP type protocols, processor interface 530 may receive tunnel related data (e.g., call ID, tunnel ID and corresponding processor information) from RMC 360 and configure CAM 520 to assign IP packets related to a subscriber to a specific processor group. CAM 520, VC-table 570, and IP table 560 may be shared by all access ports and trunk ports in ISN 100.

VC-table 570 may store data representing a mapping of the VPI/VCI header information in an ATM cell to a unique connection identifier. Thus, VC-table 510 returns the connection identifier in response to receiving VPI/VCI header data. IP table 560 and VC-table 570 may be implemented using fast memories such as SRAMs.

CAM 520 may be similar to CAM 250 of FIG. 2B and includes masks per CAM location. The masks and search fields are configured such that a matching entry can be identified quickly. The manner in which CAM 520 may need to be configured will be clearer from the below description.

The output of CAM 520 may represent an identifier. The identifier may either directly represent a processor or a processor group, or may serve as an index for a further search. In the embodiments described herein, the identifier represents a processor group or an index into IP table 560. The output of CAM 520 may also specify whether the output is to be interpreted as an index or as an index for a further search.

Assignment logic 550 receives each IP packet in the form of a sequence of cells, and determines the processor group on which to process the IP packet. To make such a determination, assignment logic 550 selects the relevant bytes of the header (IP header and upper protocol headers as requires), typically from the first cell of a sequence of cells forming an IP packet. The selected bytes are provided as an input to CAM 520. The output of CAM 520 represents an identifier as noted above.

In an embodiment, the cell header is modified for all the sequence of cells forming an IP packet, with the modified header identifying the processor (group) on which to process the IP packet. An example embodiment of packet service card 350 using the modified cell header to assign to the identified processor (group) is described below in further detail with reference to FIGS. 6 and 7. The Figures further illustrate the use of multiple CAM searches when the length of the search field of the CAM is not long enough.

10. Method

Figure 6:
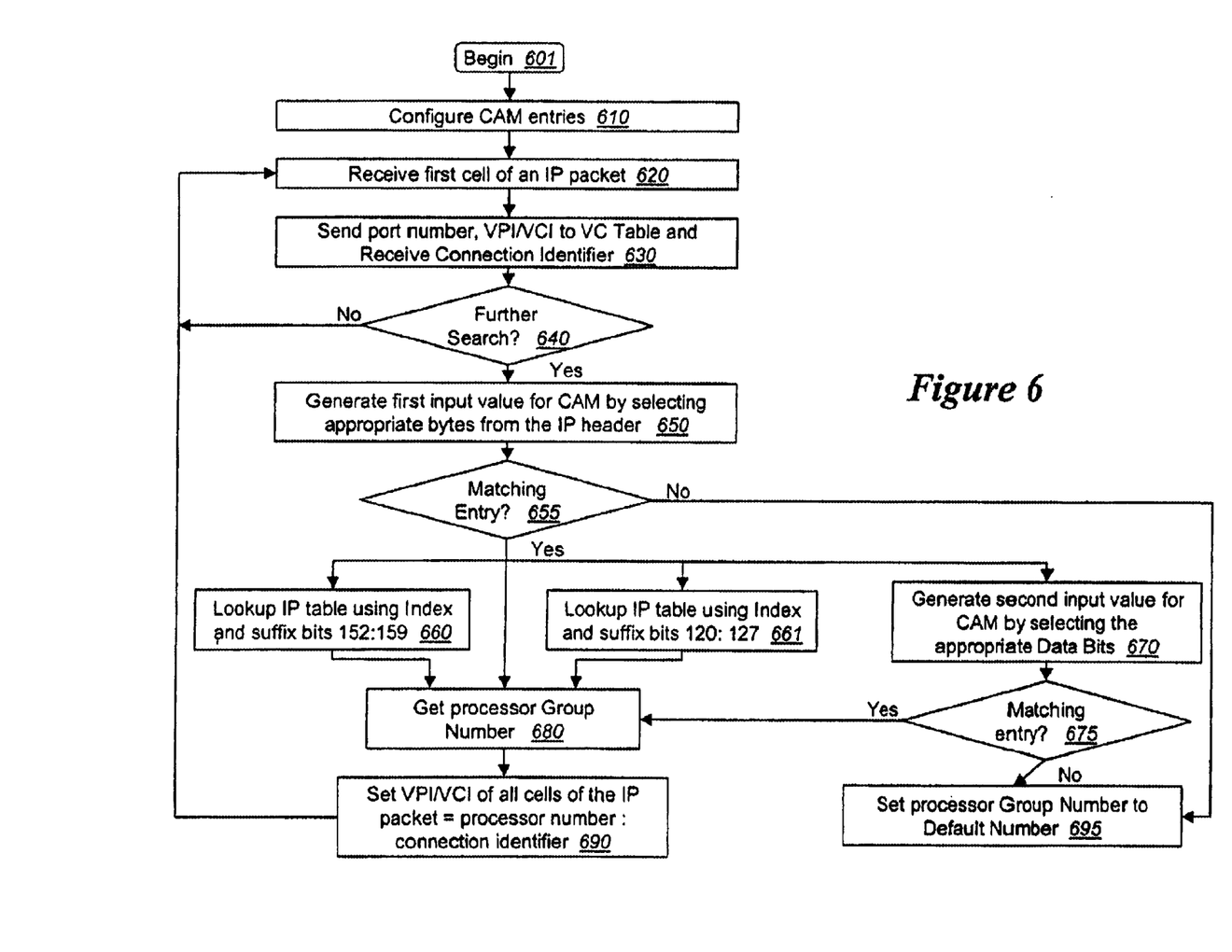
FIG. 6 is a flow-chart illustrating the steps performed to determine the processor identifier for different applications in an embodiment of the present invention.

FIG. 6 depicts a flow-chart illustrating the manner in which IP packets related to a subscriber can be assigned to a processor(s) in accordance with the present invention. In step 610, the masks and search fields in each of the CAM locations are configured, with the masks specifying the bit positions to be examined, and the search fields specifying the specific values (from the packet header) which identify a subscriber. As noted above, RMC 360 and processor interface 530 may perform such configuration in an embodiment. Typical considerations in some example scenarios are described below.

Some of the entries of CAM 520 may be configured dynamically when ISN 150 is operational and processing the subscriber data. For example, when a subscriber establishes a connection by dialing-in over a telephone line and is assigned a new IP address, an entry may be established based on IP destination address.

Some other entries of CAM 520 may be configured statically. For example, when multiple subscribers share the same ATM virtual connection and are connected to the same access port, and if the IP address(es) used by each subscriber are known, a CAM entry may be configured for examination of the source IP address.

In an embodiment, a single entry may be used for each subscriber, uniquely identifiable by a single (source or destination) IP address. One problem with using an entry for each such subscriber is that an unreasonably large number of locations may be required in CAM 520. The large location requirement may be a problem at least in ISP environments in which each subscriber may be assigned a unique address upon dialing into the ISP network. The present invention can be used to minimize the number of locations required in CAM 520 as described below in further detail.

Instead of assigning a single location for each IP address, a single location may be allocated for a group of IP addresses. The processor for processing the IP packet may be determined in combination with the entries stored in IP table 560. For example, the first three bytes of the IP address may identify the group, and the output of CAM 520 may serve as an index to a base address of IP table 560. The last byte of the IP address may serve as the offset from the base address, and the location in IP table 560 at the offset may contain the processor number.

When a single CAM location contains an index for a group of IP addresses, the mask for the CAM location may be chosen to reflect the grouping. For example, the first three bytes of an IP address may represent a group, and a mask of 00.00.00.ff may be chosen. Therefore, the CAM search provides an index to the first of the 256 (or 254 to account of subnet broadcasts) addresses, and IP table 560 may be accessed to determine the processor for processing a received IP packet. The retrieval of the processor identifier from IP table 560 is described below (with reference to step 660 and 661) in further detail.

In the case of tunneling, as noted above, the IP version number, header length, IP protocol type (i.e., for UDP), IP destination address, UDP destination port number, L2TP version number, tunnel ID and call ID may be examined to determine the processor for processing an IP packet. The necessary information generated during tunnel and call set-up may be provided by RMC 360 as noted above, and CAM 520 may be configured with the appropriate mask and search field.

In some situations, multiple subscribers may share the same tunnel. In such a situation, each subscriber may be uniquely identified by the IP addresses. To minimize the CAM lookups, all the packets for a tunnel may be assigned to a single packet service card 350, and the processors in the assigned packet service card 350 may differentiate between different subscribers by the examination of IP addresses encoded within the tunnel data.

In step 620, the first cell ("header cell") of a sequence of cells forming an IP packet may be received. The last cell of an IP packet may be determined according to AAL5 ATM standard well known in the relevant arts, and a subsequent cell may be deemed to be the first cell of the IP packet.

In step 630, replacement logic 550 may send the port number on which the cell was received, VPI and VCI of the received cell to VC-table 570, and receive a connection identifier and data indicating whether further search is required. Further search is typically required if the assignment to a processor (group) requires further examination of the IP packet formed by the cells.

Typically, a data bit retrieved from VC-table 570 indicates whether further search is required. If no search is required, the header of the cells of the IP packet may not be altered and be passed to switch interface 580. Control may then pass to step 620 if further search is not required and to step 650 if further search is required.

In step 650, replacement logic 550 may construct a first input value for CAM 520 by selecting some of the bytes from the cells forming an IP packet. The bytes need to be selected consistent with the search fields and masks used in the storage in step 610. Typically, the first cell includes all the data required to construct the input value.

In an embodiment, ISN 150 may support both LLC/SNAP and VC Mux. In general, VC Mux may be setup for a single protocol (IP version 4 in the example here), and LLC/SNAP includes a byte which specifies the Ethertype field. The Ethertype field may specify IP version 4 or 6, or other protocols common in the Ethernet type environments. Only the details of LLC/SNAP and VC Mux as applicable to the present invention are provided here. For a further description of the two protocols, the reader is referred to RFC 1483, which is incorporated in its entirety herewith.

To accommodate both LLC/SNAP and VC Mux protocols, an embodiment of replacement logic 550 may include the following bytes in the first input value:

Bytes 1 and 2 (of the first input value): Ethertype field of LLC/SNAP or don't care in the case of VC Mux Byte 3: Byte 1 of IP header Bytes 4–5: Bytes 7 and 8 of IP header Byte 6: Byte 10 of IP header Bytes 7–9: Bytes 13–15 of IP header Bytes 10–13: Bytes 17–20 of IP header Byte 14: Search type field described below Search type field may specify different types of searches being performed on CAM 520. For example, the field may specify whether it is a first search (i.e., step 650) or a second search (i.e., step 670 described below). The field may further specify whether the input IP packet is received on a LLC/SNAP type virtual connection or VC Mux type virtual connection. It may be noted again that the search fields in each of the CAM locations need to be stored consistent with the format for the input values. Typically, the type field for the second search onwards may be formed from the output of previous search.

Again, data in search field 261 needs to be stored consistent with the format (i.e., selected bytes and the sequence in which presented to CAM) of the input values. The format of the input field in an example scenario is noted above.

The output of CAM 520 may be examined in step 655 to determine whether a matching entry exists. If no match is detected, control passes to step 695 where a default processor group may be chosen to process the IP packet. In case of a match, control passes to one of steps 660, 661, 670 and 680 depending on the output of CAM 520 as described below.

The output data of CAM 520 identifies the processor (group) either directly or indirectly. The data itself may contain a processor identifier in the case of direct identification. In the case of indirect identification, additional searches are typically required. To specify whether the CAM output contains the processor identifier or not, a flag may be included in the output. The flag identifies the manner in which the processor can be determined further.

If the flag has a first value (for example, 1), the search for the matched entry corresponds to a group of subscribers, who are being identified by destination IP addresses. Therefore, in step 660, an entry with address of [pre-specified base address identified by the retrieved Index +the last byte of the IP destination address in the received IP packet] in IP table 560 may be retrieved. The retrieved entry may contain the processor (group) identifier.

If the flag has a second value, the search for the matched entry corresponds to a group of subscribers, who are identified by source IP addresses. Control then passes to step 661. Step 661 is performed similar to step 660, except that the last byte of the source IP address (i.e., bits 120:127) is used as an offset from the base address identified by the retrieved index. Control passes to step 680 from both steps 660 and 661, where the processor identifier is selected from the result of the access from IP table 560.

If the flag has a third value, the result of the search for the CAM search of step 650 contains the processor identifier. This may be the case, for example, when IP packets requiring a specific specialized service have to be assigned to a specialized processor. Another example is when a received IP packet relates to a routing protocol such as OSPF. The CAM entries may need to be configured consistent with such matching requirements in step 610.

If the flag has a fourth value, control passes to step 675, in which case a further search of CAM 520 may be required to determine the processor (group) identifier. These further searches may be required in cases such as, L2TP, L2F, IP Sec, as will apparent to one skilled in the relevant arts. As noted above, the second level of search may be required due to the limited number of bits (e.g., 112) available in the search field of CAMs with masks. Should CAMs contain sufficient number of bits in the search field, the multiple levels can be avoided for more throughput performance.

In an embodiment, the second input value for CAM 520 may have the following format assuming a 20 byte IP header:

Byte 1–2 (of the second input value): Bytes 23 and 24 representing the UDP destination port number Bytes 3–13: Bytes 27–37 of the received cell Byte 14: Search type The search type may specify that the present search represents a second search, which may avoid any inadvertent matches. In an embodiment, the search type of the second search may be formed from the bits of the output of the first search. The format and the bytes chosen above suffice for searching for IP Sec, L2TP, L2F, and many other protocols as will be apparent to one skilled in the relevant arts based on the disclosure provided herein.

If there is a matching entry, the CAM output may contain the processor group identifier and control passes to step 680. In step 680, the appropriate bits in the output may be selected for the processor group identifier. If no matching entry exists, control passes to step 695, in which a default processor identifier is chosen. All unmatched IP packets may be sent to a default processor.

Thus, a processor group identifier is determined at the end of steps 680 and 695. Control then passes to step 690, which illustrates an example approach for ensuring that the identified processor group executes the IP packet received in the form of multiple ATM cells.

In step 690, the VCI and VPI fields of all the ATM cells forming the IP packet are replaced respectively by the connection identifier and the processor identifier. The last cell of the IP packet may be determined according to AAL5 of the ATM standard as is well known in the relevant arts. Once the last cell is processed in step 690, control passes to step 620, where the first cell of a subsequent IP packet is examined.

Thus, the method of FIG. 6 illustrates an example approach of efficiently assigning the IP packet to a pre-designated processor group. The processor group may be identified by the VPI field as noted above in step 690. As described above, switch fabric 340 may forward the cells to the processor group identified by the VPI field. As the processor group contains the processing rules for the subscriber to which the cells relate to, the corresponding processing rules may be applied in processing the cells (or the IP packet formed from the cells).

Thus, by replacing the VPI/VCI fields of the ATM header, replacement logic 550 ensures that a packet received in the form of ATM cells is sent to the appropriate processor group. An embodiment of replacement logic 550 is described in further detail below.

11. Replacement Logic

Figure 7:
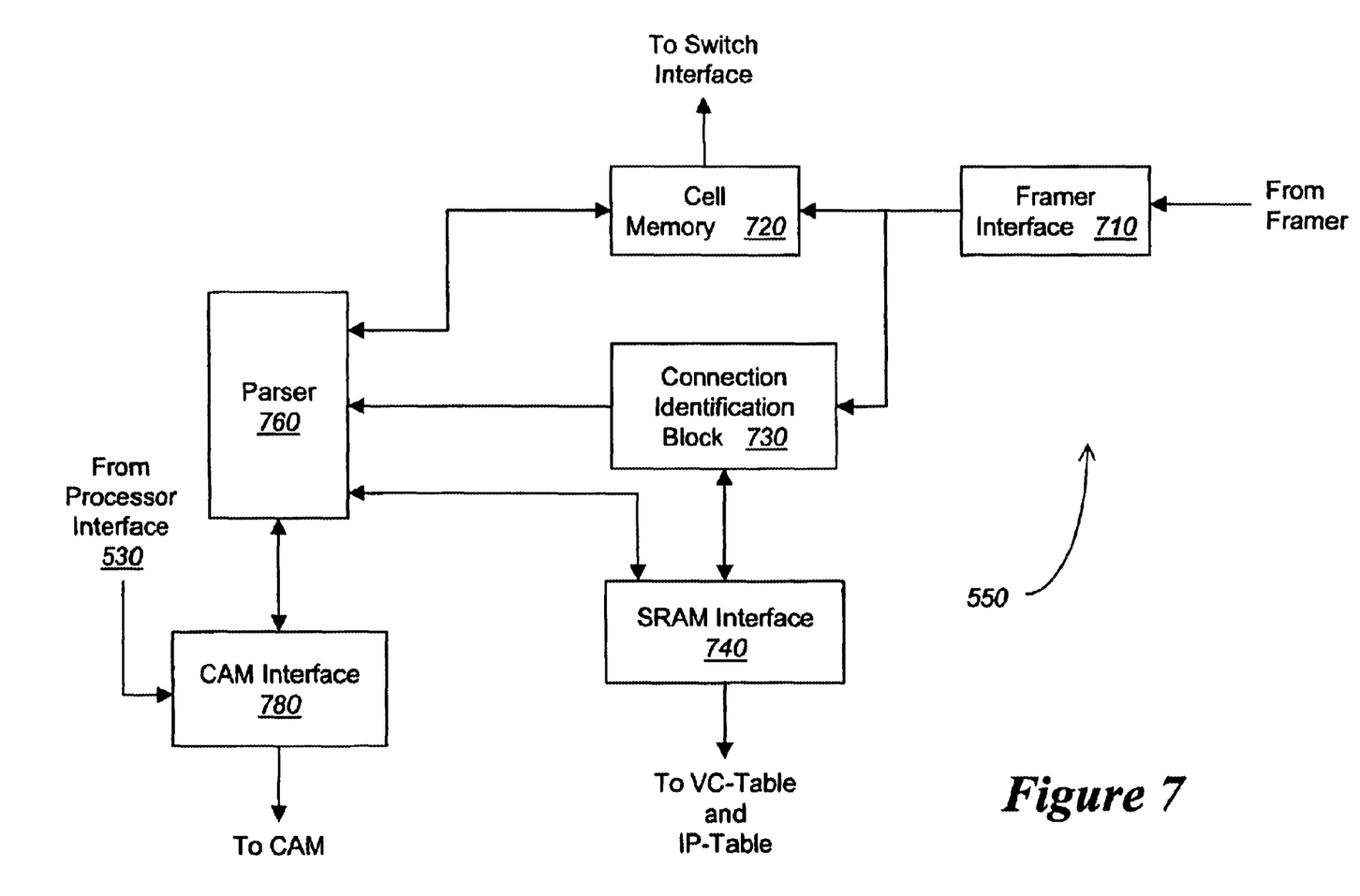
FIG. 7 is a block diagram illustrating the detail of an embodiment of replacement logic which modifies the cell header using the method of FIG. 6.

FIG. 7 is a block diagram illustrating the details of replacement logic 550 in one embodiment. Framer interface 710 receives bytes from framer 510 and stores the received bytes in cell memory 720. Connection identification block 730 receives the header bytes, and sends the VPI/VCI data and port number to VC-table 570. Connection identification block 730 receives a connection identifier from VC-table 570 if VC-table 570 is pre-configured with the data for the connection. If the connection data is not pre-specified, the cells may be sent to a specialized pre-designated processor group. Connection identification block 730 may interface with VC-table 570 using SRAM interface 740.

Parser 760 may perform all steps of the flow-chart of FIG. 6 except step 610 by interfacing with other components. Parser 760 receives the connection identifier from connection identification block 730 and header data in the IP packet from cell memory 720, and determines the processor group identifier. Parser 760 may interface with CAM 520 through CAM interface 780, and with IP table 560 through SRAM interface 740.

Using the retrieved data, parser 760 may determine the VPI/VCI of the cells when substitution is required. Parser 760 may store the new values in cell memory 720 to substitute the new VPI/VCI values. Cell memory 720 may need to contain sufficient storage space to buffer cells for sufficient time while parser 760 determines the new VPI/VCI data. The data from cell memory 720 is sent to switch interface 580.

Thus, by replacing the VCI field of cells with the processor identifier, parser 760 may enable switch fabric 340 to quickly forward cells to the appropriate processor group for processing the IP packets. The processor group may in turn be configured to provide the service policies specific to the corresponding subscribers.

Even though the present invention is described as assigning data to different processor groups for providing different service policies, it will be apparent to implement the present invention in several other embodiments as will be apparent to one skilled in the relevant arts based on the disclosure provided herein. Such other embodiments are contemplated to be within the scope and spirit of the present invention.

12. Conclusion

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method of assigning an internet protocol (IP) packet related to a subscriber to a processor in an Internet service node (ISN), said ISN containing a plurality of processors, wherein said processor is capable of processing said IP packet to provide service policies desired for said subscriber, said method comprising the steps of:

(a) configuring a location of a content addressable memory (CAM), said CAM containing a plurality of locations including said location, each of said plurality of locations having a mask, a search field and an output field, said CAM being designed to receive an input value and compare said input value with data in said search field at bit positions specified by said mask for each of said plurality of locations, said CAM being designed to generate as output the data stored in said output field if there is a match with the corresponding location, said search field and said mask of said location being configured with data identifying said subscriber, said output field of said location being set to data identifying one or more processors suitable for processing data related to said subscriber;

(b) receiving said IP packet in the form of a sequence of cells including a first cell containing the header data of said IP packet;

(c) providing data in said first cell as said input value to said CAM;

(d) receiving as an output of said CAM the data stored in said output field of a location if the corresponding search field matches said input value at the bit positions specified by the corresponding mask; and (e) assigning said sequence of cells to said one or more processors identified by said output received in step (d), whereby said IP packet is assigned to said one or more processors suitable for processing said IP packet if the data in said first cell matches data stored in said location at bit positions specified by said mask of said location.

2. The method of claim 1, wherein said data provided in step (c) comprises bytes 1, 7, 8, 10, and 13–20 of said IP header.

3. The method of claim 1, wherein said output of step (d) identifies a processor group suitable for processing said IP packet and said processor group includes said one or more processors assigned to in step (e).

4. The method of claim 1, wherein a switch fabric forwards each cell to one of said one or more processors according to the cell header, and step (e) comprises the step of modifying the cell header of said sequence of cells.

5. The method of claim 4, comprising the further steps of:

(f) storing a mapping of virtual path identifier/virtual channel identifier (VPI/VCI) and port number to a connection identifier in a virtual channel (VC) table, wherein each entry of said VC table further indicates whether the VPI/VCI of a received cell needs to be replaced;

(g) accessing an entry in said VC table corresponding to said first cell; and (h) performing steps (c)–(e) only if said retrieved entry indicates that the VPI/VCI of said first cell needs to be replaced.

6. The method of claim 5, wherein step (e) comprises the steps of:

(i) setting the VCI of said sequence of cells to said connection identifier;

(j) generating a processor identifier or a processor group identifier using said output of step (d); and (k) setting the VPI of said sequence of cells to said processor identifier or said processor group identifier, wherein said switch fabric uses said VPI to forward said sequence of cells to one of said processors.

7. The method of claim 1, wherein step (a) comprises the step of setting said mask of said location to examine at least some of the bit positions corresponding to an IP address, and said search field of said location to a plurality of IP addresses in combination with said mask, wherein at least some of said IP addresses are associated with said subscriber.

8. The method of claim 7, wherein each of said IP addresses comprises an IP source address.

9. The method of claim 8, wherein each of said IP addresses comprises an IP destination address.

10. The method of claim 7, said method comprises the further steps of:

(l) maintaining an IP table mapping each of said plurality of IP addresses to a processor identifier or a processor group identifier; and (m) using bits in the masked positions of the IP address of said IP packet and said output of step (e) to retrieve said processor identifier or said processor group identifier, wherein said processor group comprises a plurality of processors, wherein said sequence of cells are assigned to a processor identified by said processor identifier or said processor group identified by said processor group identifier.

11. The method of claim 1, wherein said search field does not contain sufficient number of bits to store data identifying said subscriber, said method comprising the further steps of:

(n) storing said data and corresponding masks identifying said subscriber in more than one of said locations;

(o) providing different portions of said data as different inputs to said CAM, wherein said input of step (c) is provided last; and (p) using said output of step (d) to identify said processor or processor group for processing only if matches exist for all of said different inputs.

12. The method of claim 11, wherein subscriber data is received using an L2TP tunnel.

13. The method of claim 11, wherein step (n) comprises the steps of:

(q) providing bytes 1, 7, 8, 10, 13–15, and 17–20 of the IP packet contained in said first cell as a first input; and (r) providing bytes 23, 24, and 27–37 of the IP packet contained in said first cell as a second input.

14. A method of assigning a cell to one of a plurality of processors comprised in an internet service node (ISN), said method comprising the steps of:

(a) configuring a content addressable memory (CAM) comprising a plurality of locations, each of said plurality of locations having a mask, a search field and an output field, said CAM being designed to receive an input value and compare said input value with data in said search field at bit positions specified by said mask for each of said plurality of locations, said search field, said mask and said output field of a first location comprised in said plurality of locations being configured with first a first search value, a first mask value and a first output value respectively, said search field, said mask and said output field of a second location comprised in said plurality of locations being configured with a second search value, a second mask and a second output value respectively, wherein said first search value, said first mask value and said first output value are not equal to said second search value, said second mask and said second output value respectively and wherein said first output value and said second output value contain data identifying one or more processors comprised in said plurality of processors;

(b) receiving said cell in said ISN;

(c) providing data in said first cell as said input value to said CAM;

(d) receiving as an output of said CAM the data stored in said output field of a location if the corresponding search field matches said input value at the bit positions specified by the corresponding mask; and (e) assigning said cell to a processor identified by said output received in step (d).

15. The method of claim 14, wherein said cells is a header cell of a sequence of cells forming a packet, said method comprising the further step of assigning all of said sequence of cells to said processor.

16. An internet service node (ISN) for processing a packet comprising a sequence of cells including a header cell, said ISN comprising:

a plurality of processors;

a content addressable memory (CAM) containing a plurality of locations, each of said plurality of locations having a mask, a search field and an output field, said CAM being designed to receive an input value and compare said input value with data in said search field at bit positions specified by said mask for each of said plurality of locations, said CAM being designed to generate as output the data stored in said output field if there is a match with the corresponding location, said search field and said mask of said location being configured with data identifying packets suitable for processing by one or more of said plurality of processors, said output field being configured with data identifying one or more processors suitable for processing a corresponding packet; and an assignment logic for receiving said header cell and providing data from said header cell as said input value of said CAM, whereby the output of said CAM identifies one or more processors suitable for processing said packet, said assignment logic assigning all of said sequence of cells to said one or more processors according to said output of said CAM, wherein said packet is processed by a suitable processor.

17. The ISN of claim 16, wherein said assignment logic is designed to assign said sequence of cells by setting at least a portion of the cell header of each cell to said identifier, said ISN further comprising a switch fabric which forwards said sequence of cells to processors according to cell headers.

18. The ISN of claim 17, wherein said ISN receives packets related to a plurality of subscribers, and wherein the mask and search fields of each location are configured to identify a subscriber, and wherein the corresponding output field is designed to identify one or more of said processors suitable for processing packets related to the subscriber identified by the corresponding mask field and search field.

19. The ISN of claim 18, wherein said packet comprises an IP packet.

20. The ISN of claim 19, wherein said mask of a location is configured for examination of at least some of the bit positions corresponding to an IP address, and said search field of said location to a plurality of IP addresses in combination with said mask, wherein at least some of said IP addresses are associated with said subscriber.

21. The ISN of claim 20, wherein each of said IP addresses comprises an IP source address.

22. The ISN of claim 20, wherein each of said IP addresses comprises an IP destination address.

23. The ISN of claim 20, further comprising a memory for storing an IP table mapping each of said plurality of IP addresses to a processor identifier or a processor group identifier, wherein said assignment logic is designed to use bits in the masked positions of the IP address and the output of said CAM to retrieve said identifier, wherein said sequence of cells are assigned to one or more processors according to said identifier.

24. The ISN of claim 19, wherein said search field does not contain sufficient number of bits to store data identifying each subscriber, and wherein said CAM is configured to store said data and corresponding masks identifying said subscriber in more than one of said locations, and wherein said assignment logic is designed to send different portions of said data as different inputs to said CAM, wherein said assignment logic determines that said packet relates to a subscriber only upon a match for all of said inputs.

25. The ISN of claim 24, wherein said assignment logic is designed to provide bytes 1, 7, 8, 10, 13–15, and 17–20 of the IP packet contained in said header cell as a first input, and bytes 23, 24, 27–37 of the IP packet contained in said header cell as a second input.

26. The ISN of claim 18, further comprising a service manager which configures said CAM to cause packets related to said subscriber to said one or more of said processors, wherein said service manager further configures said one or more processors with processing rules suitable for processing said packets related to said subscriber.

27. The ISN of claim 16, further comprising an access port, wherein said access port contains said CAM and said assignment logic.

28. The ISN of claim 16, further comprising a trunk port, wherein said trunk port contains said CAM and said assignment logic.

* * * * *